United States Patent

Geen

[11] 3,926,368
[45] Dec. 16, 1975

[54] STEAM TRAP TEMPERATURE INDICATING ARRANGEMENT

[75] Inventor: Wesley C. Geen, Addison, Ill.

[73] Assignee: Reliance Brooks, Inc., Cleveland, Ohio

[22] Filed: Aug. 19, 1974

[21] Appl. No.: 498,711

[52] U.S. Cl. ............... 236/41; 73/356; 116/114 Y; 116/114 AJ; 236/94
[51] Int. Cl.$^2$ ................. G05D 23/12; G08B 23/00
[58] Field of Search....... 116/114 V, 114 P, 114 AJ, 116/114 Y; 236/53, 41, 94; 137/171; 165/110; 73/356

[56] References Cited
UNITED STATES PATENTS

| | | | |
|---|---|---|---|
| 1,667,935 | 5/1928 | Hutchinson | 236/41 |
| 2,174,485 | 9/1939 | Zies | 236/53 |
| 2,261,473 | 4/1938 | Jennings | 116/114 V |
| 2,490,933 | 12/1949 | Tornquist et al. | 116/114 V |
| 2,708,896 | 5/1955 | Smith et al. | 116/114 P |
| 3,002,385 | 10/1961 | Wahl et al. | 116/114 V |
| 3,059,474 | 10/1962 | Keller et al. | 116/114 V |
| 3,651,695 | 3/1972 | Brown | 116/114 V |
| 3,684,737 | 8/1972 | Emigh | 116/114 V X |

Primary Examiner—Jerry W. Myracle
Assistant Examiner—Daniel M. Yasich
Attorney, Agent, or Firm—Edward M. Steutermann

[57] ABSTRACT

An indicator arrangement for visual detection of the failure of a steam trap installed in a system including a device to use the steam and a system to collect condensed steam emitted from the device where the present invention provides a temperature responsive element, which changes color upon exposure to a selected temperature range, lower than the temperature of the steam in the system to which the trap is connected, and where the element is attached to the outlet side of the steam trap, so that the element changes color when the temperature of the outlet reaches the selected temperature indicating that the steam trap has failed to operate properly.

23 Claims, 2 Drawing Figures

STEAM TRAP TEMPERATURE INDICATING ARRANGEMENT

BACKGROUND OF THE INVENTION

Steam traps, which are known in the art and provide means to selectively emit condensate from an apparatus while retaining live steam within the apparatus, are widely used. One application includes the use of steam traps in heating buildings, and for use in industrial processing industries, where steam is applies to various items of equipment to provide heat to the equipment. The heat lost by the steam in performing the selected heating function results in condensation of the steam at the saturation temperature dependant on the pressure of the steam. The resulting condensate formed from loss of heat by the steam must be emitted from the system and this is accomplished by use of a steam trap, which prevent loss of steam, but permit ejection of condensate and air to a condensate return system where it is returned to the steam generator for regeneration and return as steam to the equipment to be heated. Normal operation of steam traps of all designs, for example so called impulse or bucket traps, provide for removal of the condensate by means of the trap. Defective steam traps permit loss of steam from the system through the steam trap to the collection system before the steam has given up the maximum heat. In such closed systems, it is ordinarily difficult to determine when a steam trap is "leaking through" that is, when the trap is not functioning properly, and is allowing "live" steam to flow into the condensate return means instead of retaining the live steam in the apparatus being heated until the steam is fully condensed.

Various previous means have been provided for determining when a steam trap is leaking or malfunctioning and allowing live steam to escape from the device being heated and returned to the steam generator.

Such previous devices have included the use of glass of clear piping at the outlet of the steam trap. However, such clear piping eventually becomes coated with a residue from the steam and, unless cleaned frequently is not on a long term basis, suitable for determining when a steam trap is leaking through. Moreover the use of clear piping is severely restricted by the temperature of the steam and condensate used in the system and, specifically, can generally be utilized only in low pressure applications.

Another means which has been previously used to determine when a steam trap in a closed system is malfunctioning includes provision of a valve and outlet at the outlet from the steam trap so that the valve and outlet at the outlet can be periodically opened to determine if live steam is present and leaking through the thermostatic trap. Such an arrangement is expensive, unnecessarily cumbersome, and requires an unacceptable amount of time in checking.

SUMMARY OF THE INVENTION

The present invention provides an arrangement whereby temperature responsive indicator strip, which changes color at a very narrow and select range of temperture, is attached to the outlet from a steam trap having a condensate inlet connected to a device heated by live steam and, an outlet which may be connected to a condensate collection system, wherein, the temperature responsive strip is fastened, for example by adhesive, to the outlet side of the steam trap and adapted to change color at a selected temperature less than the temperature of the saturated steam applied to the device to be heated.

The type of temperature sensitive indicator provided to be adhered to the outlet of a steam trap, and particularly the temperature at which the indicator changes color, is determined by the pressure of the steam in the device to which the steam trap is connected.

Various other features of the present invention will become obvious to those skilled in the art upon reading the disclosure set forth hereinafter.

DESCRIPTION OF THE DRAWINGS

Referring now to the drawings which show on example of an arrangement within the scope of the present invention.

Figure 1:
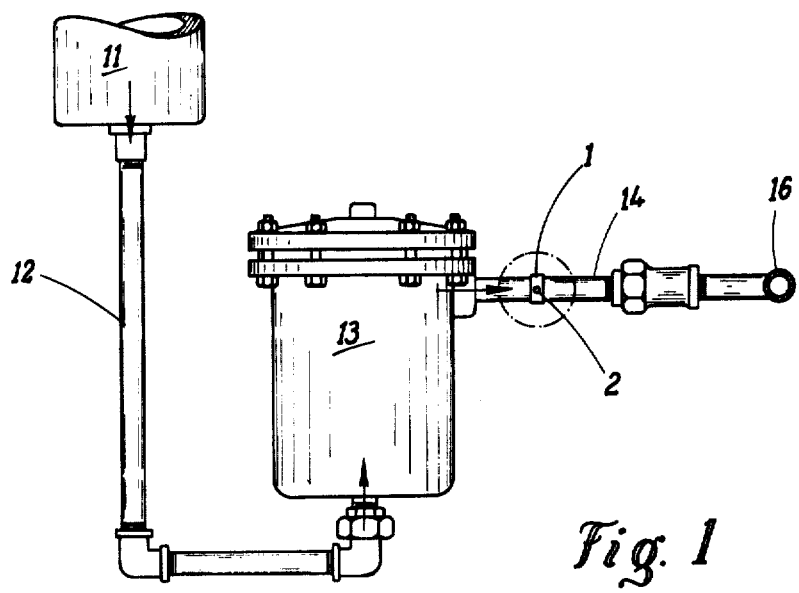
FIG. 1 shows an arrangement in accordance with the present invention.

In the example in accordance with the present invention shown in FIG. 1, a thermosensitive indicator strip 1, which includes a temperature responsive element 2 which changes color at a preselected range of temperature to indicate that the strip has been exposed to a selected temperature, is fixed to the outlet pipe 14 of a steam trap 13 as described hereinafter. Examples of composition of temperature elements 2, for use in connection with the present invention, are disclosed in various U.S. patents including U.S. Pat. No. 3,059,474 and U.S. Pat. No. 3,002,385.

Figure 2:
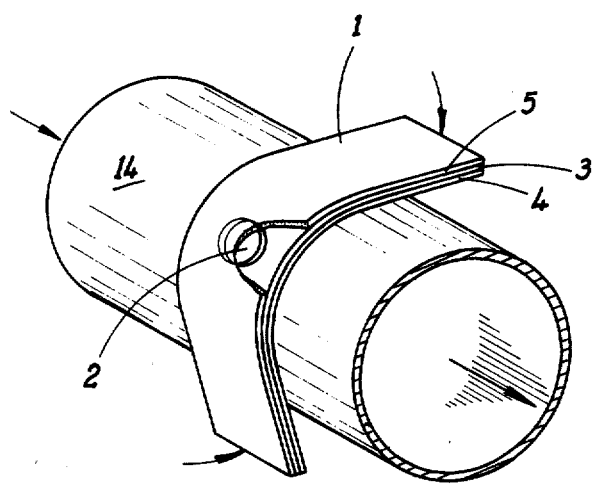
FIG. 2 is an illustration of one example of a temperature sensitive indicator material which can be used in accordance with the present invention.

Referring next to FIG. 2, which illustrates one example of a temperature sensitive strip 1 which can be utilized in carrying out the present invention, the strip 1 can include a thin film-like base 3, which can, for example, be coated with a film of selected adhesive 4 for use in attaching and securing temperature indicating strip 1 to the outlet 14 of steam trap 13 as discussed hereinafter. Strip 1 can further provide an upper layer of film 5 which can be of suitable clear or transparent synthetic plastic material. Such plastics such as tetraflourethylene resin, commercially available as teflon, or various polyethelene resins, sold under the tradename "Alathon", can be employed. Fabrication of, strip 1 of such plastic materials is desiriable to provide resistance to weather, oils, solvents, and to provide substantial mechanical strength.

The temperature responsive element 2 of selected composition to change color within a narrow, selected, temperature range is encapsulated between the upper and lower films 3 and 5. Specifically, upper and lower films 3 and 5, are sealed together around element 2 to prevent moisture or other detoriating affect on element 2.

In a typical operation the arrangement in accordance with the present invention is provided in a situation including a heater which can be any heating equipment or process equipment heated by steam. The steam is provided to heater 11 at a selected pressure from a steam generator means (not shown) depending on the temperature to be maintained in heater 11 and the pressure rating of heater 11.

Heater 11 includes an outlet 12 for emission of condensed steam or "condensate" formed as live steam in heater 11 gives up heat. A steam trap 13 is connected to outlet 12 of heater 11. Steam trap 13 can, for example, be a thermostatic trap, or bucket trap or disc trap or any other trap of a type known in the art. An outlet 14 from trap 13 is connected to a condensate return 16.

indication when the repaired or replaced trap is leaking.

TABLE NO. 1

Relationship Between Temperature Range Selected For Element 2 Color Change and Steam Pressure in Heated Device at Selected Back Pressure in Condensate Return System

| Steam Pressure in Heated Device Lb/sq in (abs) | Equilibrium Saturated Steam Temperature In Heated Device Degrees F. | Temperature Range (Below Temperature of Saturated Steam in Heated Device) in which Element 2 is Selected to Change Color — Degrees F. at indicated Back Pressure PSIG in outlet from steam trap. | | | | | | | | |
|---|---|---|---|---|---|---|---|---|---|---|
| | | 0/5 | 5/10 | 10/15 | 15/20 | 20/25 | 25/30 | 30/35 | 35/40 | 40/45 |
| 14.7 | 212 | 20 | 15 | | | | | | | |
| 20 | 228 | 20 | 15 | | | | | | | |
| 35 | 260 | 20 | 15 | | | | | | | |
| 35 | 260 | 40 | 35 | 25 | 20 | 10 | | | | |
| 55 | 287 | 40 | 35 | 25 | 20 | 10 | | | | |
| 75 | 308 | 40 | 35 | 25 | 20 | 10 | | | | |
| 75 | 308 | 80 | 75 | 65 | 50 | 45 | 40 | | | |
| 100 | 335 | 80 | 75 | 65 | 50 | 45 | 40 | | | |
| 120 | 341 | 80 | 75 | 65 | 50 | 45 | 40 | | | |
| 120 | 341 | 100 | 95 | 90 | 85 | 75 | 70 | 65 | 60 | 55 |
| 215 | 388 | 100 | 95 | 90 | 85 | 75 | 70 | 65 | 60 | 55 |
| 300 | 418 | 100 | 95 | 90 | 85 | 75 | 70 | 65 | 60 | 55 |

Condensate emitted through outlet 12 from heater 11 enters steam trap 13 where, when a sufficient quantity of condensate is collected in trap 13, trap 13 is actuated by means dependent in the situation of the trap, to emit the collected condensate through outlet 14 to condensate return 16. It is, of course, undesirable to have live steam flowing through trap 13. When this occurs, trap 13 has failed and is said to be "leaking". Leaking is undesirable because it leads to inefficient use of steam since live, or uncondensed, steam is returned to the steam generator instead of being utilized in providing heat in heater 11 as intended.

As condensate is formed by condensation of steam in heater 11, the condensate begins to cool as it is collected in trap 13, whereas live steam does not cool, so the temperature of the live steam is significantly higher than the temperature of the condensate emitted from outlet 14 of trap 13. Therefore, in accordance with one advantageous feature of the present invention thermal indicating element 2 of strip 1, affixed by means of adhesive film 4 to outlet 14 of steam trap 13, is selected to change color within a selected temperature range below the temperature of saturated live steam at the pressures at which the steam is admitted to heater 11, but at a temperature somewhat about the temperature of condensate emitted through outlet 14.

It is recognized that temperature measurement downstream of steam traps, for detection of defective traps, depends on several factors, including the pipe thickness, rate of flow through the outlet pipe and, very importantly, back pressure in the condensate return system. In the situation where a trap is defective the temperature of the fluid emitted from the trap is higher than the equilibrium temperature at the pressure of the condensate recovery system, or the back pressure to which the trap outlet is subjected. The lower temperature at which indicating element 2 changes color is established by the equilibrium temperature at the pressure of the condensate recovery system.

Therefore, when trap 13 is leaking, the temperature of the live steam passing through the trap raises the temperature of outlet 14, the failure of the trap is indicated by a change in the color of indicator block 2 of tape 1, so the trap can be repaired or changed. At the same time indicator strip 1 is changed to provide an indication when the repaired or replaced trap is leaking.

Advantageously, and in accordance with one advantageous feature of the present invention, indicator element 2 can be selected to change color at a selected temperature in accordance with the pressure of the steam utilized to provide the heat to the heater 11. Ordinarily, higher pressure steam, which, is supplied to heater 11 at a higher temperature will cool faster in passing through trap 13 than will lower pressure steam. Accordingly, the present invention recognizes that the difference between the temperature at which the indicator element 2 changes color and the temperature of the saturated live steam can be less when lower pressure steam is used then when higher pressure steam is used.

It is further recognized that the back pressure in the condensate return system with which the trap 13 communicates for return of condensate to the steam generator affects the temperature range selected for change of color of Element 2 to indicate failure of trap 13.

Table No. 1 shows relationships between steam pressure in heater 11, the back pressure in condensate return 14 and the maximum difference between the saturated steam temperature and the temperature at which element 2 can be selected to change temperature which have been found to be satisfactory.

For example, if steam having a pressure between atmospheric 14.7 PSIA and 35 PSIA (pounds per square inch absolute) is admitted to heater 11, and the back pressure is condensate return 16 is between 0 and 5 PSIG (pounds per square inch Gage), in accordance with one feature of the present invention, it has been found that element 2 should be selected to change color at a temperature less than 20°below the saturated steam temperature. For example, in accordance with the present invention, when saturated steam at 20 PSIA is introduced to heater 11 the saturated steam temperature is 228°F. and indicator element 2 of strip 1 attached to outlet 14 of steam trap 13, as shown in the arrangement in FIG. 1, strip 1 advantageously changes color at a temperature between 208 and 228° Fahrenheit to indicate failure of trap 13 when live steam is present in outlet 14.

On the other hand, for a steam heating application using saturated steam in the range of 75 to 120 PSIA, where the back pressure in condensate return 16 is between 10 and 15 PSIG, the temperature at which the indicator strip changes color is at most 65° lower than the saturated steam temperature.

For saturated steam introduced to heater 11 at pressures in the range 120 to 300 PSIA where the back pressure in condensate return 16 is 25 to 30 PSIG, the temperature at which indicator elements 2 change color at most 70° Fahrenheit less than that the saturated steam temperature.

The change in the differential between the saturated steam temperature and the temperature at which indicator 2 changes color for the various steam pressure ranges is useful because, in accordance with one feature of the present invention, it is recognized that the condensate from higher pressure steam cools faster while retained in the condensate system at, and before, steam trap 13 than does the condensate from lower pressure steam so that the difference in temperature differentials compensates for the rate of cooling, of the condensate prior to emission from the trap as well as differences in rate of heat transfer through condensate piping for different temperatures. The present invention further recognizes that the different temperature ranges are useful to make allowance for the fact that at lower steam pressure the change in saturated steam temperature per unit of change of saturated steam pressure is greater than at higher steam pressures.

It is to be recognized that the foregoing are but a few examples in accordance with the present invention, and that various other arrangements will undoubtedly occur to those skilled in the art upon reading the disclosures set forth hereinbefore. Accordingly, the scope of the present invention is limited only by the claims appended hereto.

The invention claimed is:

1. An arrangement including: a) heater means adapted to receive steam at a selected pressure; b) heater outlet means connected with said heater means to provide for emission of condensate from said heater means; c) a steam trap means having inlet means connected with said heater outlet means and trap outlet means to provide for emission of condensate from said trap means; and d) a temperature actuated indicator element fastened in heat transfer relation with a condensate return pipe means from said trap outlet means including a temperature sensitive material preselected to change color at a selected temperature between 10 and 35 degrees centigrade lower than the saturated steam temperature of said steam in said heater means where the pressure of said saturated steam varies from 0 PSIG to 300 PSIG and wherein said temperature actuated indicator is fastened on the condensate pipe means so as to give an indication of when the steam trap means is leaking.

2. The invention of claim 1 wherein:
   a. said trap outlet means includes the outlet pipe means; and
   b. said indicator element includes adhesive means to secure said indicator element to said outlet pipe means in heat transfer relation.

3. The invention of claim 1 wherein:
   a. the steam pressure in said heater means is between 14.7 and 35 PSIA, the fluid pressure in said trap outlet is between 0 and 5 PSIG and the temperature at which said indicator element changes color is less than 20° Fahrenheit below the equilibrium saturation temperature of said steam at the pressure in said heater means.

4. The invention of claim 1 wherein:
the steam pressure in said heater means is between 14.7 and 35 PSIA, the fluid pressure at said trap outlet means is between 5 and 10 PSIG and the temperature at which said indicator element changes color is less than 15° Fahrenheit below the equilibrium saturation temperature of said steam in said heater means.

5. The invention of claim 1 wherein:
the pressure of steam in said heater means is between 35 and 75 PSIA, the fluid pressure in said trap outlet means is between 0 and 5 PSIG and the temperature at which said indicator element changes color is less than 40° Fahrenheit below the equilibrium saturation temperature at the pressure of said steam in said heater means.

6. The invention of claim 1 wherein:
the pressure of steam in said heater means is between 35 and 75 pounds per square inch absolute, the fluid pressure in said trap outlet means is between 5 and 10 PSIG, and the temperature at which said indicator element changes color is less than 35° Fahrenheit below the equilibrium saturation temperature of said steam at the pressure of said steam in said heater means.

7. The invention of claim 1 wherein:
the pressure of steam in said heater means is between 35 and 75 pounds per square inch absolute, the fluid pressure in said trap outlet means is between 10 and 15 PSIG, and the temperature at which said indicator element changes color is less than 25° Fahrenheit below the equilibrium saturation temperature of said steam at the pressure of said steam in said heater means.

8. The invention of claim 1 wherein:
the pressure of steam in said heater means is between 35 and 75 pounds per square inch absolute, the fluid pressure in said trap outlet means is between 15 and 20 PSIG, and the temperature at which said indicator element changes color is less than 20° Fahrenheit below the equilibrium saturation temperature of said steam at the pressure of said steam in said heater means.

9. The invention of claim 1 wherein:
the pressure of steam in said heater means is between 35 and 75 pounds per square inch absolute, the fluid pressure in said trap outlet means is between 20 and 25 PSIG, and the temperature at which said indicator element changes color is less than 10° Fahrenheit below the equilibrium saturation temperature of said steam at the pressure of said steam in said heater means.

10. The invention of claim 1 wherein:
the pressure of steam in said heater means is between 75 and 120 pounds per square inch absolute, the fluid pressure in said trap outlet means is between 0 and 5 PSIG, and the temperature at which said indicator element changes color is less than 80° Fahrenheit below the equilibrium saturation temperature of said steam at the pressure of said steam in said heater means.

11. The invention of claim 1 wherein:
the pressure of steam in said heater means is between 75 and 120 pounds per square inch absolute, the fluid pressure in said trap outlet means is between 5 and 10 PSIG, and the temperature at which said indicator element changes color is less than 75° Fahrenheit below the equilibrium saturation temperature of said steam at the pressure of said steam 12. The invention of claim 1 wherein:
the pressure of steam in said heater means is between 75 and 120 pounds per square inch absolute, the fluid pressure in said trap outlet means is between 10 and 15 PSIG, and the temperature at which said indicator element changes color is less than 65° Fahrenheit below the equilibrium saturation temperature of said steam at the pressure of said steam in said heater means.

13. The invention of claim 1 wherein:
the pressure of steam in said heater means is between 75 and 120 pounds per square inch absolute, the fluid pressure in said trap outlet means is between 15 and 20 PSIG, and the temperature at which said indicator element changes color is less than 50° Fahrenheit below the equilibrium saturation temperature of said steam at the pressure of said steam in said heater means.

14. The invention of claim 1 wherein:
the pressure of steam in said heater means is between 75 and 120 pounds per square inch absolute, the fluid pressure in said trap outlet means is between 20 and 25 PSIG, and the temperature at which said indicator element changes color is less than 45° Fahrenheit below the equilibrium saturation temperature of said steam at the pressure of said steam in said heater means.

15. The invention of claim 1 wherein:
the pressure of steam in said heater means is between 75 and 120 pounds per square inch absolute, the fluid pressure in said trap outlet means is between 25 and 30 PSIG, and the temperature at which said indicator element changes color is less than 40° Fahrenheit below the equilibrium saturation temperature of said steam at the pressure of said steam in said heater means.

16. The invention of claim 1 wherein:
the pressure of steam in said heater means is between 120 and 300 pounds per square inch absolute, the fluid pressure in said trap outlet means is between 0 and 5 PSIG, and the temperature at which said indicator element changes color is less than 95° Fahrenheit below the equilibrium saturation temperature of said steam at the pressure of said steam in said heater means.

17. The invention of claim 1 wherein:
the pressure of steam in said heater means is between 120 and 300 pounds per square inch absolute, the fluid pressure in said trap outlet means is between 10 and 15 PSIG, and the temperature at which said indicator element changes color is less than 90° Fahrenheit below the equilibrium saturation temperature of said steam at the pressure of said steam in said heater means.

18. The invention of claim 1 wherein:
the pressure of steam in said heater means is between 120 and 300 pounds per square inch absolute, the fluid pressure in said trap outlet means is between 15 and 20 PSIG, and the temperature at which said indicator element changes color is less than 85° Fahrenheit below the equilibrium saturation temperature of said steam at the pressure of said steam in said heater means.

19. The invention of claim 1 wherein:
the pressure of steam in said heater means is between 120 and 300 pounds per square inch absolute, the fluid pressure in said trap outlet means is between 20 and 25 PSIG, and the temperature at which said indicator element changes color is less than 75° Fahrenheit below the equilibrium saturation temperature of said steam at the pressure of said steam in said heater means.

20. The invention of claim 1 wherein:
the pressure of steam in said heater means is between 120 and 300 pounds per square inch absolute, the fluid pressure in said trap outlet means is between 25 and 30 PSIG, and the temperature at which said indicator element changes color is less than 70° Fahrenheit below the equilibrium saturation temperature of said steam at the pressure of said steam in said heater means.

21. The invention of claim 1 wherein:
the pressure of steam in said heater means is between 120 and 300 pounds per square inch absolute, the fluid pressure in said trap outlet means is between 30 and 35 PSIG, and the temperature at which said indicator element changes color is less than 60° Fahrenheit below the equilibrium saturation temperature of said steam at the pressure of said steam in said heater means.

22. The invention of claim 1 wherein:
the pressure of steam in said heater means is between 120 and 300 pounds per square inch absolute, the fluid pressure in said trap outlet means is between 35 and 40 PSIG, and the temperature at which said indicator element changes color is less than 55° Fahrenheit below the equilibrium saturation temperature of said steam at the pressure of said steam in said heater means.

23. The invention of claim 1 wherein:
the pressure of steam in said heater means is between 120 and 300 pounds per square inch absolute, the fluid pressure in said trap outlet means is between 40 and 45 PSIG, and the temperature at which said indicator element changes color is less than 55° Fahrenheit below the equilibrium saturation temperature of said steam at the pressure of said steam in said heater means.

* * * * *